United States Patent
Li et al.

(10) Patent No.: US 11,146,342 B1
(45) Date of Patent: Oct. 12, 2021

(54) METHOD AND APPARATUS FOR DEVICE PERFORMANCE TEST

(71) Applicant: Beijing University of Posts and Telecommunications, Beijing (CN)

(72) Inventors: Yong Li, Beijing (CN); Mugen Peng, Beijing (CN); Wenbo Wang, Beijing (CN)

(73) Assignee: Beijing University of Posts and Telecommunications, Beijing (CN)

( * ) Notice: Subject to any disclaimer, the term of this patent is extended or adjusted under 35 U.S.C. 154(b) by 0 days.

(21) Appl. No.: 17/215,510

(22) Filed: Mar. 29, 2021

(30) Foreign Application Priority Data

Nov. 19, 2020 (CN) .......................... 202011302860.2

(51) Int. Cl.
*H04B 17/00* (2015.01)
*H04B 17/29* (2015.01)
*H04B 17/15* (2015.01)

(52) U.S. Cl.
CPC ......... *H04B 17/0087* (2013.01); *H04B 17/15* (2015.01); *H04B 17/29* (2015.01)

(58) Field of Classification Search
CPC ............ H04B 17/0085; H04B 17/3912; H04B 17/0087; H04B 17/29; H04B 17/15; H04B 17/309; H04B 17/00; H04B 17/19
See application file for complete search history.

(56) References Cited

U.S. PATENT DOCUMENTS

| | | | | |
|---|---|---|---|---|
| 7,925,253 | B2* | 4/2011 | Breit | H04B 17/15 455/425 |
| 8,412,112 | B2* | 4/2013 | Foegelle | H04B 17/3911 455/67.12 |
| 10,256,930 | B2* | 4/2019 | Karajani | H04B 7/06 |
| 10,680,723 | B1* | 6/2020 | Schmidt | H04B 17/364 |
| 2019/0103926 | A1* | 4/2019 | Chen | H04B 7/0413 |

* cited by examiner

*Primary Examiner* — Nhan T Le
(74) *Attorney, Agent, or Firm* — Marshall, Gerstein & Borun LLP

(57) ABSTRACT

The embodiments of the present disclosure provide a method and apparatus for device performance test, which relate to the field of communication technology. The method includes receiving a signal sent by a base station simulator; simulating a channel used for transmitting the signal, and performing simulated transmission on the signal based on the simulated channel; and sending the signal after the simulated transmission to respective probe in the anechoic chamber through an output interface connected to the probe, so that the probe radiates the received signal in the anechoic chamber in which the device under test is placed, and performs performance test on the device under test, where each probe is connected to an output interface of the channel simulator. By the solution provided by the embodiments of the present disclosure, the efficiency of device performance test can be improved.

16 Claims, 3 Drawing Sheets

METHOD AND APPARATUS FOR DEVICE PERFORMANCE TEST

CROSS-REFERENCE TO RELATED APPLICATIONS

This application claims the benefit and priority of Chinese Patent Application No. 202011302860.2, entitled "METHOD AND APPARATUS FOR DEVICE PERFORMANCE TEST" and filed on Nov. 19, 2020. The entire disclosures of each of the above applications are incorporated herein by reference.

TECHNICAL FIELD

The present disclosure relates to the field of communication technology, and more particularly, to a method and apparatus for device performance test.

BACKGROUND

In recent years, as the market share of communication devices based on 5G technology increases year by year, more and more users use the above communication devices, and the quality requirements of users for communication devices also increase. Therefore, it brings new challenges for the performance test of communication devices.

In the prior art, a conduction test method is generally used to test a communication device. However, the above method requires disassembling the shell of the device under test, which destroys the integrity of the device under test, and needs to measure an antenna pattern in advance, thereby resulting in a low efficiency of communication device performance test.

SUMMARY

The purpose of various embodiments of the present disclosure is to provide a method and apparatus for device performance test, so as to improve the efficiency of communication device performance test. Specific technical solutions are as follows.

In one aspect, an embodiment of the present disclosure provides a method for device performance test. The method is applied to a channel simulator and includes:
 receiving a signal sent by a base station simulator;
 simulating a channel used for transmitting the signal, and performing simulated transmission on the signal based on the simulated channel, where a spatial correlation of the simulated channel satisfies an equation:

$$\rho_t(u_1, u_2) = \frac{1}{M}\sum_{m=1}^{M} G_{u_1}(\vartheta_m) G_{u_2}(\vartheta_m)^*,$$

where, $u_1$, $u_2$ represents an identification of an antenna of a device under test, $\rho_t(u_1, u_2)$ represents the spatial correlation of the simulated channel, M is the number of sub-paths in each sub-path cluster in a preset channel, $\vartheta_m$ represents an angle of arrival (AoA) of the $m^{th}$ sub-path, $G_{u_1}(\vartheta_m)$ represents an antenna pattern of the $u_1^{th}$ antenna of the device under test that is placed in an anechoic chamber, and $G_{u_2}(\vartheta_m)^*$ represents a conjugate of an antenna pattern of the $u_2^{th}$ antenna of the device under test;
 sending the signal after the simulated transmission to respective probe in the anechoic chamber through an output interface connected to the probe, so that the probe radiates the received signal in the anechoic chamber in which the device under test is placed, and performs performance test on the device under test, where each probe is connected to an output interface of the channel simulator.

In another aspect, an embodiment of the present disclosure provides a method for device performance test. The method is applied to a channel simulator and includes:
 receiving a signal sent by respective probe in an anechoic chamber through an output interface connected to the probe, where each probe is connected to an output interface of the channel simulator;
 simulating a channel used for transmitting the signal, and performing simulated transmission on the signal based on the simulated channel, where a spatial correlation of the simulated channel satisfies an equation:

$$\rho_t(u_1, u_2) = \frac{1}{M}\sum_{m=1}^{M} G_{u_1}(\vartheta_m) G_{u_2}(\vartheta_m)^*,$$

where, $u_1$, $u_2$ represents an identification of an antenna of a device under test, $\rho_t(u_1, u_2)$ represents the spatial correlation of the simulated channel, M is the number of sub-paths in each sub-path cluster in a preset channel, $\vartheta_m$ represents an angle of arrival (AoA) of the $m^{th}$ sub-path, $G_{u_1}(\vartheta_m)$ represents an antenna pattern of the $u_1^{th}$ antenna of the device under test that is placed in an anechoic chamber, and $G_{u_2}(\vartheta_m)^*$ represents a conjugate of an antenna pattern of the $u_2^{th}$ antenna of the device under test;
 sending the signal after the simulated transmission to a base station simulator, so that the base station simulator receives the signal and performs performance test on the device under test.

In another aspect, an embodiment of the present disclosure provides an apparatus for device performance test. The apparatus is applied to a channel simulator and includes:
 a signal receiving module, configured to receive a signal sent by a base station simulator;
 a signal transmission module, configured to simulate a channel used for transmitting the signal, and perform simulated transmission on the signal based on the simulated channel, where a spatial correlation of the simulated channel satisfies an equation:

$$\rho_t(u_1, u_2) = \frac{1}{M}\sum_{m=1}^{M} G_{u_1}(\vartheta_m) G_{u_2}(\vartheta_m)^*,$$

where, $u_1$, $u_2$ represents an identification of an antenna of a device under test, $\rho_t(u_1, u_2)$ represents the spatial correlation of the simulated channel, M is the number of sub-paths in each sub-path cluster in a preset channel, $\vartheta_m$ represents an angle of arrival (AoA) of the $m^{th}$ sub-path, $G_{u_1}(\vartheta_m)$ represents an antenna pattern of the $u_1^{th}$ antenna of the device under test that is placed in an anechoic chamber, and $G_{u_2}(\vartheta_m)^*$ represents a conjugate of an antenna pattern of the $u_2^{th}$ antenna of the device under test;
 a signal sending module, configured to send the signal after the simulated transmission to respective probe in the anechoic chamber through an output interface connected to the probe, so that the probe radiates the received signal in the anechoic chamber in which the device under test is placed, and performs performance test on the device under test, where each probe is connected to an output interface of the channel simulator.

In another aspect, an embodiment of the present disclosure provides an apparatus for device performance test. The apparatus is applied to a channel simulator and includes:

a signal receiving module, configured to receive a signal sent by respective probe in an anechoic chamber through an output interface connected to the probe, where each probe is connected to an output interface of the channel simulator;

a signal transmission module, configured to simulate a channel used for transmitting the signal, and perform simulated transmission on the signal based on the simulated channel, where a spatial correlation of the simulated channel satisfies an equation:

$$\rho_t(u_1, u_2) = \frac{1}{M} \sum_{m=1}^{M} G_{u_1}(\vartheta_m) G_{u_2}(\vartheta_m)^*,$$

where, $u_1$, $u_2$ represents an identification of an antenna of a device under test, $\rho_t(u_1,u_2)$ represents the spatial correlation of the simulated channel, M is the number of sub-paths in each sub-path cluster in a preset channel, $\vartheta_m$ represents an angle of arrival (AoA) of the $m^{th}$ sub-path, $G_{u_1}(\vartheta_m)$ represents an antenna pattern of the $u_1^{th}$ antenna of the device under test that is placed in an anechoic chamber, and $G_{u_2}(\vartheta_m)^*$ represents a conjugate of an antenna pattern of the $u_2^{th}$ antenna of the device under test;

a signal sending module, configured to send the signal after the simulated transmission to a base station simulator, so that the base station simulator receives the signal and performs performance test on the device under test.

In another aspect, an embodiment of the present disclosure provides a channel simulator. The channel simulator includes a processor, a communication interface, a memory and a communication bus; where the processor, the communication interface and the memory communicate with each other through the communication bus;

the memory is configured to store a computer program;

the processor is configured to execute the program stored in the memory, to perform the method steps described in the embodiments of the present disclosure.

In another aspect, an embodiment of the present disclosure provides a computer-readable storage medium. The computer-readable storage medium stores a computer program that, when executed by a processor, performs the method steps described in the embodiments of the present disclosure.

As can be seen from the above, when performing device performance test by using the solution provided by the embodiments of the present disclosure, the channel simulator receives the signal sent by the base station simulator and simulates the channel used for transmitting the signal, so that the spatial correlation of the simulated channel satisfies the preset equation. Further, the channel simulator performs simulated transmission on the signal based on the simulated channel, and sends the signal after the simulated transmission to respective probe in the anechoic chamber through the output interface connected to the probe, so that the probe radiates the received signal in the anechoic chamber in which the device under test is placed. In this way, the device under test can receive the signal radiated by the probe, thereby implementing the performance test of the device under test. It can be seen that when performing device performance test by using the solution provided by the embodiments of the present disclosure, the performance test of a communication device can be performed without disassembling the shell of the device under test during the performance test process of the communication device, thereby improving the efficiency of performance test of the communication device.

In addition, since the channel used for signal transmission is the channel simulated by the channel simulator, and the spatial correlation of the simulated channel satisfies the target equation, the simulated channel can reproduce various parameters of the channel accurately, thereby improving the accuracy of device performance test. In addition, it can be seen that the device performance test is implemented based on air interface radiation in the embodiments of the present disclosure. Therefore, the solution of device performance test provided by the embodiments of the present disclosure is an air interface test solution. In addition, when the device performance test is implemented based on air interface radiation, the antenna pattern of the device under test can be determined after the test environment is constructed, so it is unnecessary to test the antenna pattern of the device under test in advance, thereby improving the effect and capability of the device performance test.

BRIEF DESCRIPTION OF THE DRAWINGS

In order to describe the solution provided by the embodiments of the present disclosure clearly, the accompanying drawings referred to in the embodiments will be illustrated briefly hereinafter. Obviously, these accompanying drawings are only some embodiments of the present disclosure, and according to these accompanying drawings, those skilled in the art can obtain other embodiments without creative labor.

DETAILED DESCRIPTION

The technical solutions in the embodiments of the present disclosure will be described clearly and completely hereinafter with reference to the accompanying drawings. Obviously, the described embodiments are only partial embodiments of the present disclosure, but are not all embodiments. According to the embodiments of the present disclosure, those skilled in the art can obtain other embodiments without creative labor, which all belong to the protection scope of the present disclosure.

Figure 1:
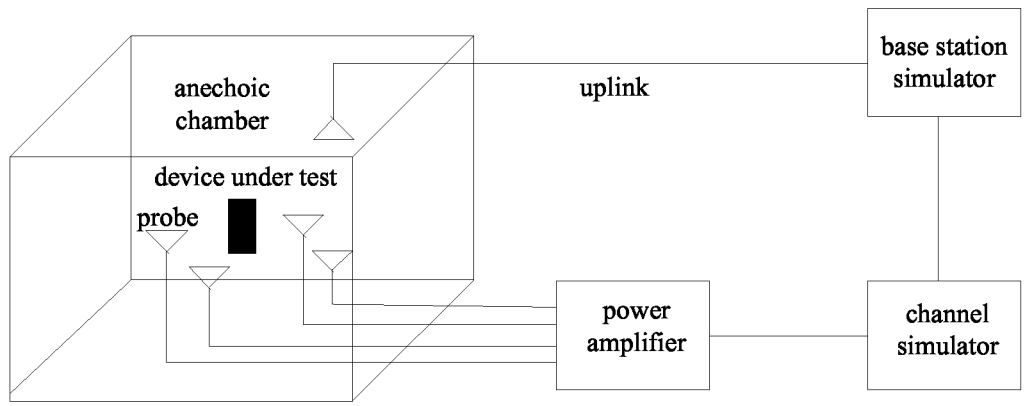
FIG. 1 is a diagram of a test environment for device performance test according to an embodiment of the present invention.

For the convenience of understanding, a test environment for device performance test in embodiments of the present disclosure, i.e., the function and test process of each component, is introduced herein. As shown in FIG. 1, the test environment for device performance test includes a base station simulator, a channel simulator, a power amplifier and an anechoic chamber.

The anechoic chamber includes probes. The anechoic chamber is used to shield radio interference from an external environment, and absorbing materials inside the anechoic chamber may reduce the reflection of probe signals. During the test, a device under test is placed in the anechoic chamber.

The above device under test refers to a device on which performance test is performed. The above device under test may be a communication device, such as a MIMO (multiple-in multiple-out) device. The device under test may be located in the center of the anechoic chamber. Alternatively, it may also be located in other locations in the anechoic chamber.

The above probes are set around the device under test. Specifically, the probes may be evenly placed around the device under test. The probes may be used to radiate a signal, and the device under test may receive the signal radiated by the probes, and perform performance test on the device under test. Alternatively, the probes may also be placed in the anechoic chamber randomly.

An antenna may also be set inside the anechoic chamber to establish an uplink connection to the base station simulator.

Specifically, the base station simulator is configured to simulate a real base station and send a signal to the channel simulator.

The channel simulator is configured to simulate a real transmission channel, perform simulated transmission on the signal based on the simulated transmission channel, and transmit the signal to respective probe in the anechoic chamber.

When simulating the above transmission channel, various parameters of the real transmission channel may be reproduced, such as time delay, Doppler spread and polarization.

The probes are located in the anechoic chamber and are configured to radiate the received signal.

A power amplifier may be included between the probes and the channel simulator.

The power amplifier is configured to compensate for the path loss of the signal between the probes and the device under test.

In one implementation, during the device performance test, the signal sent by the base station simulator is processed by the channel simulator and then sent to the probes in the anechoic chamber. The probes radiate the signal after receiving the signal to perform performance test on the device under test.

In the performance test of the device under test, the uplink and downlink throughput of the device under test may be tested.

Figure 2:
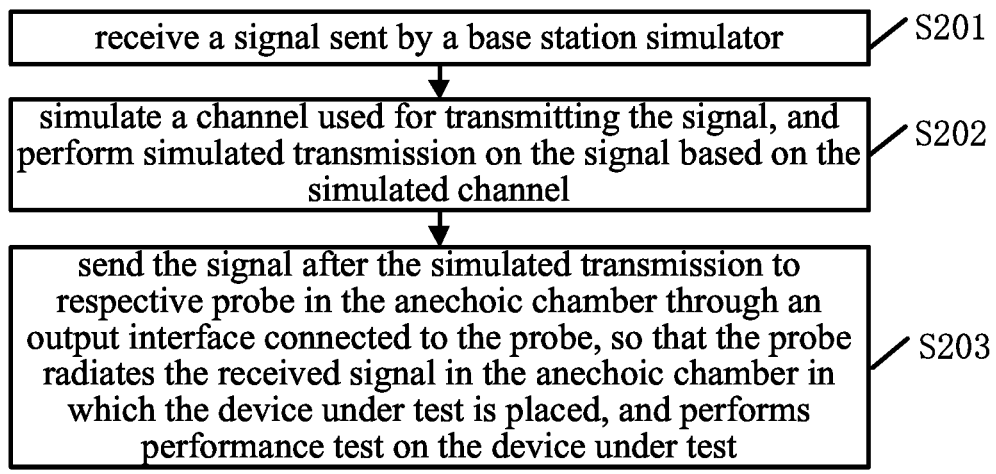
FIG. 2 is a flowchart of a first method for device performance test according to an embodiment of the present disclosure.

FIG. 2 is a flowchart of a first method for device performance test according to an embodiment of the present disclosure. The method is applied to a channel simulator and includes the following steps S201-S203.

Step S201, receive a signal sent by a base station simulator.

Step S202, simulate a channel used for transmitting the signal, and perform simulated transmission on the signal based on the simulated channel.

A spatial correlation of the simulated channel satisfies the following equation:

$$\rho_t(u_1, u_2) = \frac{1}{M}\sum_{m=1}^{M} G_{u_1}(\vartheta_m)G_{u_2}(\vartheta_m)^*.$$

Where, $u_1$, $u_2$ represents an identification of an antenna of a device under test, $\rho_t(u_1,u_2)$ represents the spatial correlation of the simulated channel, M is the number of sub-paths in each sub-path cluster in a preset channel, $\vartheta_m$ represents an angle of arrival (AoA) of the $m^{th}$ sub-path, $G_{u_1}(\vartheta_m)$ represents an antenna pattern of the $u_1^{th}$ antenna of the device under test that is placed in an anechoic chamber, and $G_{u_2}(\vartheta_m)^*$ represents a conjugate of an antenna pattern of the $u_2^{th}$ antenna of the device under test;

In this way, it can be considered that the channel simulated by the channel simulator reproduces the channel in the real transmission environment, thereby reproducing the spatial correlation of the channel in the real transmission environment. Alternatively, it can also be considered that the channel simulator reproduces various parameter characteristics of the channel in the real transmission environment.

On this basis, the above step S202 can be interpreted as: the channel simulator processes the signal to be transmitted according to the above equation, and then outputs the processed signal. Since the above equation indicates the spatial correlation of the channel, and the spatial correlation reflects the spatial correlation of the channel in the real transmission environment, the transmission of the signal processed according to the above equation is similar to the transmission of the signal in the real transmission environment.

Step S203, send the signal after the simulated transmission to respective probe in the anechoic chamber through an output interface connected to the probe, so that the probe radiates the received signal in the anechoic chamber in which the device under test is placed, and performs performance test on the device under test.

Each probe is connected to an output interface of the channel simulator.

Specifically, the above probes may be evenly placed around the device under test. Alternatively, the probes may also be placed around the device under test randomly.

After fading through the channel simulator, the signal sent by the base station simulator is transmitted to the probes in the anechoic chamber, and then radiated by the probes to the device under test.

As can be seen from the above, when performing device performance test by using the solution provided by this embodiment, the channel simulator receives the signal sent by the base station simulator and simulates the channel used for transmitting the signal, so that the spatial correlation of the simulated channel satisfies the preset equation. Further, the channel simulator performs simulated transmission on the signal based on the simulated channel, and sends the signal after the simulated transmission to respective probe in the anechoic chamber through the output interface connected to the probe, so that the probe radiates the received signal in the anechoic chamber in which the device under test is placed. In this way, the device under test can receive the signal radiated by the probe, thereby implementing the performance test of the device under test. It can be seen that when performing device performance test by using the solution provided by the embodiments of the present disclosure, the performance test of a communication device can be performed without disassembling the shell of the device under test during the performance test process of the communication device, thereby improving the efficiency of performance test of the communication device.

In addition, since the channel used for signal transmission is the channel simulated by the channel simulator, and the spatial correlation of the simulated channel satisfies the target equation, the simulated channel can reproduce various parameters of the channel accurately, thereby improving the accuracy of device performance test. In addition, it can be seen that the device performance test is implemented based on air interface radiation in the embodiments of the present disclosure. Therefore, the solution of device performance test provided by the embodiments of the present disclosure is an air interface test solution. In addition, when the device performance test is implemented based on air interface radiation, the antenna pattern of the device under test can be determined after the test environment is constructed, so it is unnecessary to test the antenna pattern of the device under test in advance, thereby improving the effect and capability of the device performance test.

Next, the derivation process of the equation satisfied by the spatial correlation of the channel proposed in the embodiments of the present disclosure will be illustrated with reference to specific embodiments.

In an embodiment of the present disclosure, a Geometry-Based Spatial Channel (GBSC) model may be used as a channel modeling model. Where, one end of the channel may be called a transmitter, and the other end may be called a receiver. The channel including the receiver and the transmitter includes N sub-path clusters. Each sub-path cluster corresponds to one path in the real transmission environment. Each sub-path cluster has its own Angle of Departure (AoD) and Angle of Arrival (AoA). There are M sub-paths in each sub-path cluster, respective sub-path has the same power, and relative to the AoA and AoD of the sub-path cluster, respective sub-path carries a different angle offset.

The spatial correlation refers to the correlation of different channels between different antennas from the receiver to the transmitter. In an embodiment of the present disclosure, when determining the spatial correlation, a time-based average method is used and the spatial correlation of the receiver is calculated according to the following steps.

Suppose there are a plurality of antennas at both the transmitter and the receiver. The antenna at the transmitter is called a transmitter antenna, and the antenna at the receiver is called a receiver antenna.

Specifically, in a first step, a channel time response $h_{u,s,n}(t)$ of the $n^{th}$ sub-path cluster from the $s^{th}$ transmitter antenna to the uh receiver antenna under single polarization is calculated according to the following formula:

$$h_{u,s,n}(t) = \sqrt{\frac{P_n}{M}} \sum_{m=1}^{M} F_s(\varphi_{n,m}) G(\vartheta_{n,m}) \exp(j2\pi\phi_{n,m}t + j\theta_{n,m}).$$

Where, t is a time sampling point, M is the number of sub-paths in each sub-path cluster in a preset channel, $P_n$ is an average power of the n sub-path cluster, $\varphi_{n,m}$ is the AoD of the $m^{th}$ sub-path in the $n^{th}$ sub-path cluster, $\vartheta_{n,m}$ is the AoA of the $m^{th}$ sub-path in the $n^{th}$ sub-path cluster, $\theta_{n,m}$ is the Doppler frequency shift of the $m^{th}$ sub-path in the $n^{th}$ sub-path cluster, $\theta_{n,m}$ is an initial phase of the ma sub-path in the $n^{th}$ sub-path cluster, $\theta_{n,m}$ is a random variable distributed between [0-2π] uniformly, $F_s(\varphi_{n,m})$ represents the antenna pattern of the $s^{th}$ transmitter antenna, and $G(\vartheta_{n,m})$ represents the antenna pattern of the $u^{th}$ receiver antenna.

In a second step, the spatial correlation of the channel is calculated based on a time average function.

The above time average function may be expressed as:

$$\varepsilon_t[\cdot] = \lim_{T \to \infty} \frac{1}{T} \int_0^T [\cdot] dt.$$

Where, • represents any expression, $\varepsilon_t[\bullet]$ represents a result of calculating the time average of •, and T represents a period.

In a third step, a spatial-time correlation $\rho_t(u_1, s_1; u_2, s_2; \tau)$ between a channel from the $u_1^{th}$ receiver channel to the $s_1^{th}$ transmitter channel and a channel from the $u_2^{th}$ receiver channel to the $s_2^{th}$ transmitter channel is calculated according to the $h_{u,s,n}(t)$ calculated in the first step and the spatial correlation of the channel calculated in the second step, and based on the following equation:

$$\rho_t(u_1, s_1; u_2, s_2; \tau) = \frac{1}{M} \sum_{m=1}^{M} \sum_{m'=1}^{M} \{F_{s_1,s_2,m,m'} * G_{u_1,u_2,m,m'} * \Theta_{m,m'} + \varepsilon_t[\Phi_{m,m'}(t+\tau,t)]\},$$

where τ is a time difference, and $F_{s_1,s_2,m,m'} \triangleq F_{s_1}(\varphi_m) F_{s_2}(\varphi_m)^*$, where $F_{s_1}(\varphi_m)$ represents the antenna pattern of the $s_1^{th}$ transmitter antenna, $F_{s_2}((\varphi_m)^*$ represents a conjugate of the antenna pattern of the $s_2^{th}$ transmitter antenna;

$G_{u_1,u_2,m,m'} \triangleq G_{u_1}(\vartheta_m) G_{u_2}(\vartheta_m)^*$, where $G_{u_1}(\vartheta_m)$ represents the antenna pattern of the $u_1^{th}$ receiver antenna, $G_{u_2}(\vartheta_m)^*$ represents a conjugate of the antenna pattern of the $u_2^{th}$ receiver antenna;

$\eta_{m,m'} \triangleq \exp(j\theta_m) \exp(j\theta_{m'})$, $\theta_{m'}$ represents an initial phase of the $m'^{th}$ sub-path;

$\Phi_{m,m'}(t_1, t_2) \triangleq \exp(j2\pi\phi_m t_1) \exp(j2\pi\phi_{m'} t_2)^*$, where $t_1$ represents a first sampling time point, $t_2$ represents a second sampling time point, Om represents the Doppler frequency shift of the $m^{th}$ sub-path, and $\phi_{m'}$ represents the Doppler frequency shift of the m sub-path.

When m=m', it means the same number of sub-paths in a sub-path cluster, which can have:

$$\varepsilon_t[\Phi_{m,m'}(t+\tau,t)] = \exp(j2\pi\phi_m \tau).$$

Where, $\varepsilon_t$ represents a calculation result of the time average within time t, and $\phi_m$ represents the Doppler frequency shift of the $m^{th}$ sub-path.

When m≠m', it means different numbers of sub-paths in a sub-path cluster, which can have:

$$\varepsilon_t[\Phi_{m,m'}(t+\tau,t)] = 0.$$

Therefore, based on the above equation, $\rho_t(u_1, s_1; u_2, s_2; \tau)$ in the third step may be simplified to the following formula:

$$\rho_t(u_1, s_1; u_2, s_2; \tau) = \frac{1}{M} \sum_{m=1}^{M} F_{s_1, s_2, m, m'} \cdot G_{u_1, u_2, m, m'} \exp(j2\pi\phi_{n,m}\tau).$$

When $s_1=s_2$, it means that a plurality of transmitter antennae are the same and a time difference $\tau=0$, and $\rho_t(u_1, s_1; u_2, s_2; \tau)$ in the third step may be further simplified to the following equation:

$$\rho_t(u_1, u_2) = \frac{1}{M} \sum_{m=1}^{M} G_{u_1}(\vartheta_m) G_{u_2}(\vartheta_m)^*.$$

The above equation for calculating the spatial correlation of the channel is recorded as Equation 1.

In one implementation, a pre-fading synthesis method may be used to calculate the spatial correlation. Specifically, a product of a channel time response of the $n^{th}$ sub-path cluster from the $s^{th}$ transmitter antenna to the $k^{th}$ probe and a transmission factor from the $k^{th}$ probe to the $u^{th}$ receiver antenna is used as a channel time response $h_{u,s,n}^{PFS}(t)$ from the transmitter to the receiver.

Specifically, the channel time response $h_{k,s,n}^{CE}(t)$ of the $n^{th}$ sub-path cluster from the $s^{th}$ transmitter antenna to the $k^{th}$ probe may be calculated according to the following formula:

$$h_{k,s,n}^{CE}(t) = \sqrt{\frac{P_n \omega_{n,k}}{M}} \sum_{m=1}^{M} F_s(\varphi_{n,m}) \exp(j2\pi\phi_{n,m}t + j\theta_{n,m,k}).$$

Where, K represents the number of probes, $P_n$ represents the power of the $n^{th}$ sub-path cluster, $\omega_{n,k}$ represents the weight of the $k^{th}$ probe corresponding to a channel containing the $n^{th}$ sub-path cluster, $\theta_{n,m,k}$ represents an initial phase of the $m^{th}$ sub-path in the $n^{th}$ sub-path cluster of a channel corresponding to the $k^{th}$ probe.

Specifically, the transmission factor $h_{u,k}^{AC}$ from the $k^{th}$ probe to the $u^{th}$ receiver antenna may be calculated according to the following formula:

$$h_{u,k}^{AC} = G_u(\vartheta_k).$$

Where, $G_u(\vartheta_k)$ is the $k^{th}$ element in the $u^{th}$ row of a K×U matrix, which represents the channel time response from the $k^{th}$ probe to the $u^{th}$ receiver antenna.

Therefore, based on the above formula, the complete channel time response $h_{u,s,n}^{PFS}(t)$ from the transmitter to the receiver may be calculated according to the following equation:

$$h_{u,s,n}^{PFS}(t) = \sum_{k=1}^{K} h_{u,k}^{AC} h_{k,s,n}^{CE}(t) =$$

$$\sqrt{\frac{P_n}{M}} \sum_{k=1}^{K} \sum_{m=1}^{M} \{\sqrt{\omega_{n,k}} F_s(\varphi_{n,m}) G_u(\vartheta_k) \exp(j2\pi\phi_{n,m}t + j\theta_{n,m,t})\}.$$

Where, $\theta_{n,m,t}$ represents an initial phase of the $m^{th}$ sub-path in the $n^{th}$ sub-path cluster at the $t^{th}$ sampling time.

Based on the above equation, the spatial correlation is calculated in time to obtain:

$$\rho_t^{PFS}(u_1, s_1; u_2, s_2; \tau) = \frac{1}{M}$$
$$\sum_{k=1}^{K} \sum_{k'=1}^{K} \sum_{m=1}^{M} \sum_{m'=1}^{M} \{F_{s_1,s_2,m,m'}^{PFS} * G_{u_1,u_2,k,k'}^{PFS} * \Theta_{k,k',m,m'}^{PFS} + \varepsilon_t[\Phi_{m,m'}^{PFS}(t+\tau, t)]\}$$

where, $$F_{s_1,s_2,m,m'}^{PFS} \triangleq F_{s_1}(\varphi_m) F_{s_2}(\varphi_{m'})^*$$

$$G_{u_1,u_2,k,k'}^{PFS} \triangleq G_{u_1}(\vartheta_k) G_{u_2}(\vartheta_{k'})^*.$$

Where, $G_{u_1}(\vartheta_k)$ is the $k^{th}$ element in the $u_1^{th}$ row of a K×U$_1$ matrix, which represents the channel time response from the $k^{th}$ probe to the $u_1^{th}$ receiver antenna, and $G_{u_2}(\vartheta_{k'})^*$ represents the $k^{th}$ element in the $u_2^{th}$ row of a K×U$_2$ matrix, which represents the channel time response from the $k^{th}$ probe to the $u_2^{th}$ receiver antenna.

$$\Theta_{k,k',m,m'}^{PFS} \triangleq \exp(j\theta_{m,k}) \exp(j\theta_{m',k'})^*$$

$$\Phi_{m,m'}^{PFS}(t_1, t_2) \triangleq \exp(j2\pi\phi_m t_1) \exp(j2\pi\phi_m t_2)^*$$

where, $\theta_{m,k}$ represents an initial phase of the $m^{th}$ sub-path in a channel corresponding to the $k^{th}$ probe, and $\theta_{m',k'}$ represents an initial phase of the $m'^{th}$ sub-path of a channel corresponding to the $k'^{th}$ probe.

When $s_1=s_2$, it means that a plurality of transmitter antennae are the same and a time difference is $\tau=0$. The above spatial correlation $\rho_t^{PFS}(u_1, u_2)$ may be derived as:

$$\rho_t^{PFS}(u_1, u_2) = \frac{1}{M} \sum_{k=1}^{K} \omega_k \cdot G_{u_1}(\vartheta_k) G_{u_2}(\vartheta_k)^* +$$

$$\frac{1}{M} \sum_{k=1}^{K} \sum_{\substack{k'=1 \\ k' \neq k}}^{K} \sqrt{\omega_k \omega_{k'}} \cdot G_{u_1}(\vartheta_k) G_{u_2}(\vartheta_{k'})^* \cdot X(k \cdot k').$$

Where, $\omega_k$ represents the weight of the $k^{th}$ probe, and $\omega_{k'}$ represents the weight of the $k'^{th}$ probe.

The above equation representing the correlation $\rho_t^{PFS}(u_1, u_2)$ is recorded as Equation 2, where $$X(k, k') \triangleq \sum_{m=1}^{M} \Theta_{k,k',m,m'}^{PFS}.$$

Based on Equation 1 and Equation 2, Equation 1 is a target equation that needs to be reproduced when performing device performance test, and Equation 2 is an equation of the spatial correlation during the device performance test. The difference between the two equations lies in that Equation 2 further includes a second sub-equation, i.e., $$\frac{1}{M} \sum_{k=1}^{K} \sum_{\substack{k'=1 \\ k' \neq k}}^{K} \sqrt{\omega_k \omega_{k'}} \cdot G_{u_1}(\vartheta_k) G_{u_2}(\vartheta_{k'})^* \cdot X(k \cdot k'),$$

and because the above sub-equation contains K(K−1) cross terms, an error occurs.

Accordingly, since the equation of the spatial correlation in the device performance test solution provided by the embodiment is the same as Equation 1, the error is eliminated, thereby reproducing the spatial correlation of the target channel accurately.

Figure 3:
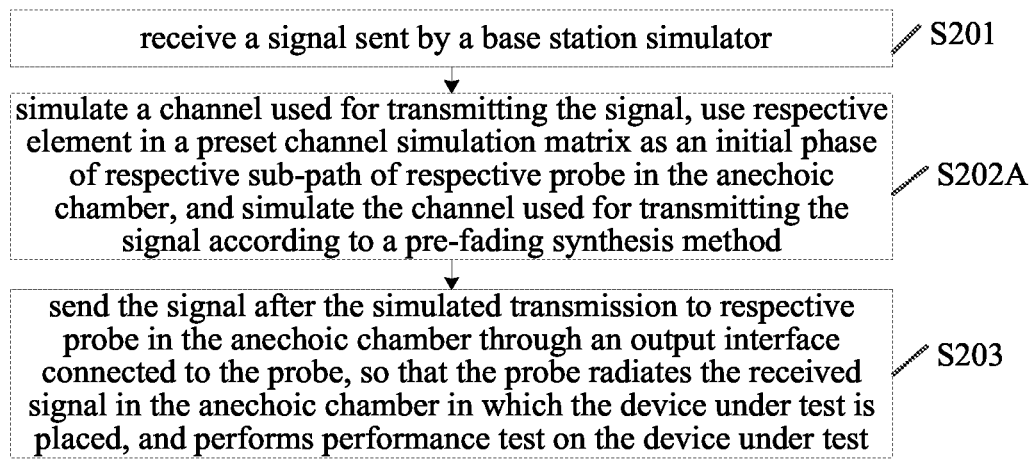
FIG. 3 is a flowchart of a second method for device performance test according to an embodiment of the present disclosure.

Referring to FIG. 3, FIG. 3 is a flowchart of a second method for device performance test according to an embodiment of the present disclosure. On the basis of the foregoing embodiments, the above step S202 may be implemented by the following step S202A.

Step S202A, simulate a channel used for transmitting the signal, use respective element in a preset channel simulation matrix as an initial phase of respective sub-path of respective probe in the anechoic chamber, and simulate the channel used for transmitting the signal according to a pre-fading synthesis method.

Where, the number of rows of the channel simulation matrix is equal to the number of sub-paths in each sub-path cluster, the number of columns of the channel simulation matrix is equal to the number of probes, and the $m^{th}$ element in the $k^{th}$ column of the channel simulation matrix represents an initial phase of the $m^{th}$ sub-path in a sub-path cluster contained in a channel corresponding to the $k^{th}$ probe; elements of each column of the channel simulation matrix are equal to a product of elements of a corresponding column in a preset discrete Fourier matrix and a rotation factor $\exp(j\alpha_k)$ corresponding to the column, $\alpha$ in a rotation factor corresponding to respective column of the preset discrete Fourier matrix is distributed between $[0,2\pi]$ evenly.

In an embodiment of the present disclosure, the above rotation factor may be generated randomly.

When a Discrete Fourier Transform (DFT) matrix is used to improve the initial phases of the sub-paths in respective sub-path cluster, a M×M discrete Fourier matrix may be generated first according to the number M of sub-paths, where M>K. Then the first K columns of the Fourier matrix may be intercepted according to the number K of probes to obtain a matrix W, where $W=[w_1, w_2, \ldots, w_K]$.

The discrete Fourier matrix may be expressed according to the following equation:

$$W = \begin{bmatrix} W_M^{0,0} & W_M^{0,1} & \ldots & W_M^{0,(M-1)} \\ W_M^{1,0} & W_M^{1,1} & \ldots & W_M^{1,(M-1)} \\ \vdots & \vdots & \ddots & \vdots \\ W_M^{(M-1),0} & W_M^{(M-1),1} & \ldots & W_M^{(M-1),(M-1)} \end{bmatrix}.$$

Where, M represents the number of sub-paths, and each element of the matrix represents $W_M=\exp(-j2\pi/M)$.

Each element of the matrix is used as the initial phase of a sub-path in respective sub-path cluster in the channel model.

Specifically, all columns of the matrix W may be multiplied by a randomly generated rotation factor $\exp(j\alpha_k)$ to generate an M×K matrix.

Since the rotation factor $\exp(j\alpha_k)$ may introduce a certain degree of randomness to the improved channel model, so that the channel model can keep consistent with the channel in terms of time correlation. In this way, on the basis of not affecting the time correlation of the channel, the reproduction effect of the spatial correlation of the channel is improved.

The generated matrix is put into the channel model, that is, the $m^{th}$ element of the $k^{th}$ column is used as the initial phase of the $m^{th}$ sub-path of the $k^{th}$ probe.

In this way, when the channel is simulated, the discrete Fourier matrix is used to improve the initial phases of the sub-paths in respective sub-path cluster in the channel model, so the time correlation of the simulated channel can keep consistent with that of the channel. On the basis of not affecting the time correlation of the channel, the reproduction effect of the spatial correlation of the channel is improved.

Figure 4:
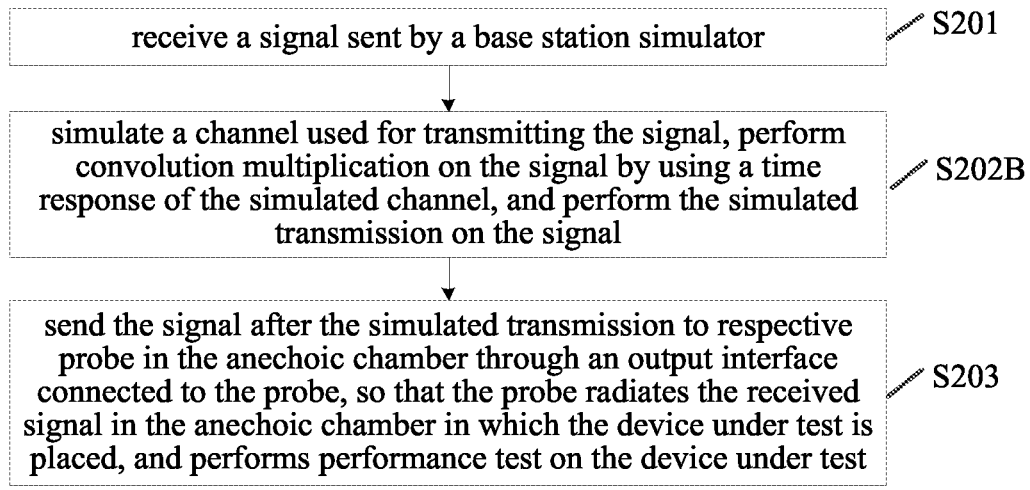
FIG. 4 is a flowchart of a third method for device performance test according to an embodiment of the present disclosure.

Referring to FIG. 4, FIG. 4 is a flowchart of a third method for device performance test according to an embodiment of the present disclosure. On the basis of the foregoing embodiments, the above step S202 may be implemented by the following step S202B.

Step S202B, simulate a channel used for transmitting the signal, perform convolution multiplication on the signal by using a time response of the simulated channel, and perform the simulated transmission on the signal.

Specifically, when performing the convolution multiplication, any convolution multiplication method in the prior art may be used, which will not be described in detail herein.

Because the convolution multiplication is performed on the signal by using the time response of the simulated channel, as a result, the simulated transmission can be performed on the signal.

Figure 5:
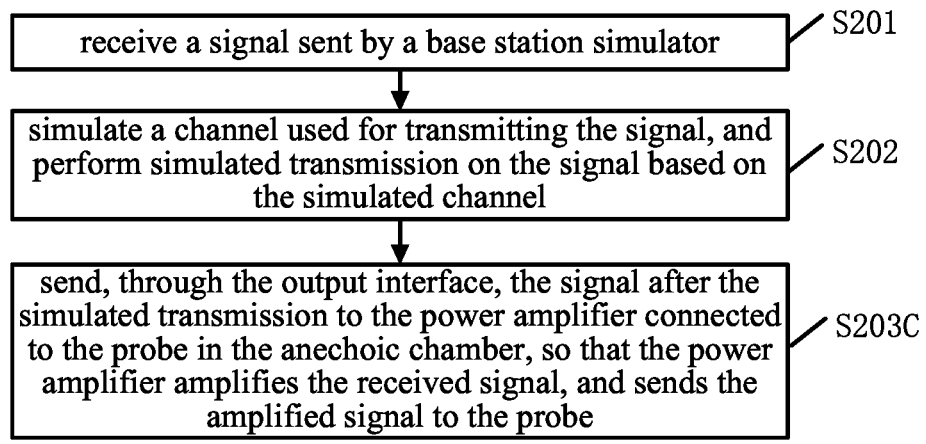
FIG. 5 is a flowchart of a fourth method for device performance test according to an embodiment of the present disclosure.

Referring to FIG. 5, FIG. 5 is a flowchart of a fourth method for device performance test according to an embodiment of the present disclosure. When respective probe in the anechoic chamber is connected to an output interface through a power amplifier, on the basis of the foregoing embodiments, step S203 may be implemented through step S203C.

Step S203C, send, through the output interface, the signal after the simulated transmission to the power amplifier connected to the probe in the anechoic chamber, so that the power amplifier amplifies the received signal, and sends the amplified signal to the probe.

Since the power amplifier can compensate for the path loss of the signal between the probe and the device under test, the signal loss can be reduced by the power amplifier.

In the embodiments of the present disclosure, respective output interface may also directly connect to respective probe without the power amplifier, and send the signal after simulated transmission to the probe.

Figure 6:
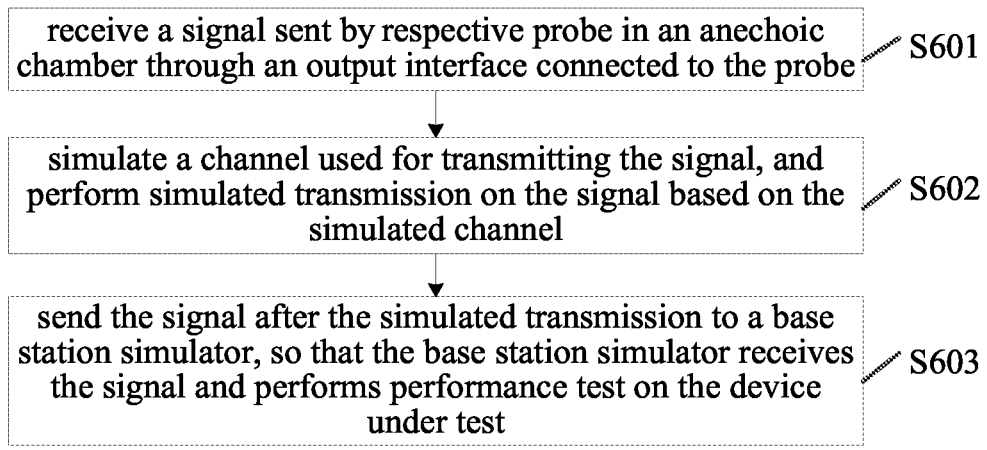
FIG. 6 is a flowchart of a fifth method for device performance test according to an embodiment of the present disclosure.

Referring to FIG. 6, FIG. 6 is a flowchart of a fifth method for device performance test according to an embodiment of the present disclosure. The method is applied to a channel simulator and includes steps S601-S603.

Step S601, receive a signal sent by respective probe in an anechoic chamber through an output interface connected to the probe.

Each of the above probes is connected to an output interface of the channel simulator.

Specifically, the above probes may be evenly placed around the device under test, or may also be placed around the device under test randomly.

In an embodiment of the present disclosure, when respective probe in the anechoic chamber is connected to an output interface through a power amplifier, respective probe may receive, through the output interface, the signal sent by the power amplifier connected to the probe in the anechoic chamber.

Because the convolution multiplication is performed on the signal by using the time response of the simulated channel, as a result, the simulated transmission can be performed on the signal.

Step S602, simulate a channel used for transmitting the signal, and perform simulated transmission on the signal based on the simulated channel.

Where, a spatial correlation of the simulated channel satisfies the following equation:

$$\rho_t(u_1, u_2) = \frac{1}{M}\sum_{m=1}^{M} G_{u_1}(\vartheta_m)G_{u_2}(\vartheta_m)^*.$$

Where, $u_1, u_2$ represents an identification of an antenna of a device under test, $\rho_t(u_1, u_2)$ represents the spatial correlation of the simulated channel, M is the number of sub-paths in each sub-path cluster in a preset channel, $\vartheta_m$ represents an angle of arrival (AoA) of the $m^{th}$ sub-path, $G_{u_1}(\vartheta_m)$ represents an antenna pattern of the $u_1^{th}$ antenna of the device under test that is placed in an anechoic chamber, and $G_{u_2}(\vartheta_m)^*$ represents a conjugate of an antenna pattern of the $u_2^{th}$ antenna of the device under test.

In this way, it can be considered that the channel simulated by the channel simulator reproduces the channel in the real transmission environment, thereby reproducing the spatial correlation of the channel in the real transmission environment. Of course, it can also be considered that the channel simulator reproduces various parameter characteristics of the channel in the real transmission environment.

On this basis, the above step S602 can be interpreted as: the channel simulator processes the signal to be transmitted according to the above equation, and then outputs the processed signal. Since the above equation indicates the spatial correlation of the channel, and the spatial correlation reflects the spatial correlation of the channel in the real transmission environment, the transmission of the signal processed according to the above equation is similar to the transmission of the signal in the real transmission environment.

Step S603, send the signal after the simulated transmission to a base station simulator, so that the base station simulator receives the signal and performs performance test on the device under test.

In an embodiment of the present disclosure, convolution multiplication is performed on the signal by using a time response of the simulated channel, and the simulated transmission is performed on the signal.

Since the power amplifier can compensate for the path loss of the signal between the probe and the device under test, the signal loss can be reduced by the power amplifier.

In the embodiments of the present disclosure, respective output interface may also directly connect to respective probe without the power amplifier, and send the signal after simulated transmission to the probe.

As can be seen from the above, when performing device performance test by using the solution provided by this embodiment, the channel simulator receives the signal sent by the probe and simulates the channel used for transmitting the signal, so that the spatial correlation of the simulated channel satisfies the preset equation. Further, the channel simulator performs simulated transmission on the signal based on the simulated channel, and sends the signal to the base station simulator, thereby implementing the performance test of the device under test. It can be seen that when performing device performance test by using the solution provided by the embodiments of the present disclosure, the performance test of a communication device can be performed without disassembling the shell of the device under test during the performance test process of the communication device, thereby improving the efficiency of performance test of the communication device.

In addition, since the channel used for signal transmission is the channel simulated by the channel simulator, and the spatial correlation of the simulated channel satisfies the target equation, the simulated channel can reproduce various parameters of the channel accurately, thereby improving the accuracy of device performance test. In addition, it can be seen that the device performance test is implemented based on air interface radiation in the embodiments of the present disclosure. Therefore, the solution of device performance test provided by the embodiments of the present disclosure is an air interface test solution. In addition, when the device performance test is implemented based on air interface radiation, the antenna pattern of the device under test can be determined after the test environment is constructed, so it is unnecessary to test the antenna pattern of the device under test in advance, thereby improving the effect and capability of the device performance test.

In an embodiment of the present disclosure, the above step S602 may be implemented in the following manner.

Respective element in a preset channel simulation matrix is used as an initial phase of respective sub-path of respective probe in the anechoic chamber, and the channel used for transmitting the signal is simulated according to a pre-fading synthesis method.

The number of rows of the channel simulation matrix is equal to the number of sub-paths in each sub-path cluster, the number of columns of the channel simulation matrix is equal to the number of probes, and the $m^{th}$ element in the $k^{th}$ column of the channel simulation matrix represents an initial phase of the $m^{th}$ sub-path in any sub-path cluster contained in a channel corresponding to the $k^{th}$ probe; elements of each column of the channel simulation matrix are equal to a product of elements of a corresponding column in a preset discrete Fourier matrix and a rotation factor $\exp(j\alpha_k)$ corresponding to the column, $\alpha$ in a rotation factor corresponding to respective column of the preset discrete Fourier matrix is distributed between $[0, 2\pi]$ evenly.

In this way, when the channel is simulated, the discrete Fourier matrix is used to improve the initial phases of the sub-paths in respective sub-path cluster in the channel model, so the time correlation of the simulated channel can keep consistent with that of the channel. On the basis of not affecting the time correlation of the channel, the reproduction effect of the spatial correlation of the channel is improved.

Figure 7:
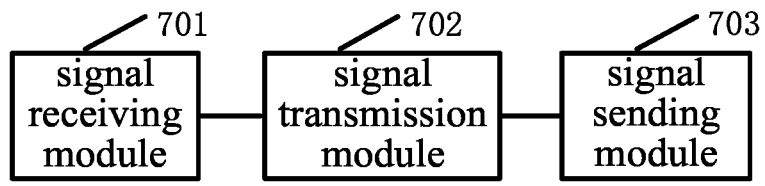
FIG. 7 is a structural diagram of a first apparatus for device performance test according to an embodiment of the present disclosure.

Referring to FIG. 7, FIG. 7 is a structural diagram of a first apparatus for device performance test according to an embodiment of the present disclosure. The apparatus is applied to a channel simulator and includes the following modules 701-703.

A signal receiving module 701 is configured to receive a signal sent by a base station simulator.

A signal transmission module 702 is configured to simulate a channel used for transmitting the signal, and perform simulated transmission on the signal based on the simulated channel, where a spatial correlation of the simulated channel satisfies an equation:

$$\rho_t(u_1, u_2) = \frac{1}{M}\sum_{m=1}^{M} G_{u_1}(\vartheta_m)G_{u_2}(\vartheta_m)^*.$$

Where, $u_1$, $u_2$ represents an identification of an antenna of a device under test, $\rho_t(u_1, u_2)$ represents the spatial correlation of the simulated channel, M is the number of sub-paths in each sub-path cluster in a preset channel, $\vartheta_m$ represents an angle of arrival (AoA) of the $m^{th}$ sub-path, $G_{u_1}(\vartheta_m)$ represents an antenna pattern of the $u_1^{th}$ antenna of the device under test that is placed in an anechoic chamber, and $G_{u_2}(\vartheta_m)^*$ represents a conjugate of an antenna pattern of the $u_2^{th}$ antenna of the device under test.

A signal sending module 703 is configured to send the signal after the simulated transmission to respective probe in the anechoic chamber through an output interface connected to the probe, so that the probe radiates the received signal in the anechoic chamber in which the device under test is placed, and performs performance test on the device under test, where each probe is connected to an output interface of the channel simulator.

As can be seen from the above, when performing device performance test by using the solution provided by this embodiment, the channel simulator receives the signal sent by the base station simulator and simulates the channel used for transmitting the signal, so that the spatial correlation of the simulated channel satisfies the preset equation. Further, the channel simulator performs simulated transmission on the signal based on the simulated channel, and sends the signal after the simulated transmission to respective probe in the anechoic chamber through the output interface connected to the probe, so that the probe radiates the received signal in the anechoic chamber in which the device under test is placed. In this way, the device under test can receive the signal radiated by the probe, thereby implementing the performance test of the device under test. It can be seen that when performing device performance test by using the solution provided by the embodiments of the present disclosure, the performance test of a communication device can be performed without disassembling the shell of the device under test during the performance test process of the communication device, thereby improving the efficiency of performance test of the communication device.

In addition, since the channel used for signal transmission is the channel simulated by the channel simulator, and the spatial correlation of the simulated channel satisfies the target equation, the simulated channel can reproduce various parameters of the channel accurately, thereby improving the accuracy of device performance test. In addition, it can be seen that the device performance test is implemented based on air interface radiation in the embodiments of the present disclosure. Therefore, the solution of device performance test provided by the embodiments of the present disclosure is an air interface test solution. In addition, when the device performance test is implemented based on air interface radiation, the antenna pattern of the device under test can be determined after the test environment is constructed, so it is unnecessary to test the antenna pattern of the device under test in advance, thereby improving the effect and capability of the device performance test.

In an embodiment of the present disclosure, the signal transmission module is configured to use respective element in a preset channel simulation matrix as an initial phase of respective sub-path of respective probe in the anechoic chamber, and simulate the channel used for transmitting the signal according to a pre-fading synthesis method.

Where, the number of rows of the channel simulation matrix is equal to the number of sub-paths in each sub-path cluster, the number of columns of the channel simulation matrix is equal to the number of probes, and the m'h element in the $k^{th}$ column of the channel simulation matrix represents an initial phase of the $m^{th}$ sub-path in a sub-path cluster contained in a channel corresponding to the $k^{th}$ probe; elements of each column of the channel simulation matrix are equal to a product of elements of a corresponding column in a preset discrete Fourier matrix and a rotation factor $\exp(j\alpha_k)$ corresponding to the column, $\alpha$ in a rotation factor corresponding to respective column of the preset discrete Fourier matrix is distributed between $[0,2\pi]$ evenly.

In this way, when the channel is simulated, the discrete Fourier matrix is used to improve the initial phases of the sub-paths in respective sub-path cluster in the channel model, so the time correlation of the simulated channel can keep consistent with that of the channel. On the basis of not affecting the time correlation of the channel, the reproduction effect of the spatial correlation of the channel is improved.

In an embodiment of the present disclosure, the signal transmission module is configured to perform convolution multiplication on the signal by using a time response of the simulated channel, and perform the simulated transmission on the signal.

Because the convolution multiplication is performed on the signal by using the time response of the simulated channel, as a result, the simulated transmission can be performed on the signal.

In an embodiment of the present disclosure, respective probe in the anechoic chamber is connected to an output interface through a power amplifier; the signal sending module is configured to send, through the output interface, the signal after the simulated transmission to the power amplifier connected to the probe in the anechoic chamber, so that the power amplifier amplifies the received signal, and sends the amplified signal to the probe.

Since the power amplifier can compensate for the path loss of the signal between the probe and the device under test, the signal loss can be reduced by the power amplifier.

Figure 8:
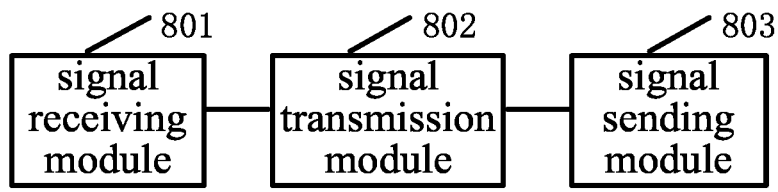
FIG. 8 is a structural diagram of a second apparatus for device performance test according to an embodiment of the present disclosure.

Referring to FIG. 8, FIG. 8 is a structural diagram of a second apparatus for device performance test according to an embodiment of the present disclosure. The apparatus is applied to a channel simulator and includes the following modules 801-803.

A signal receiving module 801 is configured to receive a signal sent by respective probe in an anechoic chamber through an output interface connected to the probe, where each probe is connected to an output interface of the channel simulator.

A signal transmission module 802 is configured to simulate a channel used for transmitting the signal, and perform simulated transmission on the signal based on the simulated channel, where a spatial correlation of the simulated channel satisfies an equation:

$$\rho_t(u_1, u_2) = \frac{1}{M}\sum_{m=1}^{M} G_{u_1}(\vartheta_m)G_{u_2}(\vartheta_m)^*.$$

Where, $u_1, u_2$ represents an identification of an antenna of a device under test, $\rho_t(u_1, u_2)$ represents the spatial correlation of the simulated channel, M is the number of sub-paths in each sub-path cluster in a preset channel, $\vartheta_m$ represents an angle of arrival (AoA) of the $m^{th}$ sub-path, $G_{u_1}(\vartheta_m)$ represents an antenna pattern of the $u_1^{th}$ antenna of the device under test that is placed in an anechoic chamber, and $G_{u_2}(\vartheta_m)^*$ represents a conjugate of an antenna pattern of the $u_2^{th}$ antenna of the device under test.

A signal sending module 803 is configured to send the signal after the simulated transmission to a base station simulator, so that the base station simulator receives the signal and performs performance test on the device under test.

As can be seen from the above, when performing device performance test by using the solution provided by this embodiment, the channel simulator receives the signal sent by the probe and simulates the channel used for transmitting the signal, so that the spatial correlation of the simulated channel satisfies the preset equation. Further, the channel simulator performs simulated transmission on the signal based on the simulated channel, and sends the signal to the base station simulator, thereby implementing the performance test of the device under test. It can be seen that when performing device performance test by using the solution provided by the embodiments of the present disclosure, the performance test of a communication device can be performed without disassembling the shell of the device under test during the performance test process of the communication device, thereby improving the efficiency of performance test of the communication device.

In addition, since the channel used for signal transmission is the channel simulated by the channel simulator, and the spatial correlation of the simulated channel satisfies the target equation, the simulated channel can reproduce various parameters of the channel accurately, thereby improving the accuracy of device performance test. In addition, it can be seen that the device performance test is implemented based on air interface radiation in the embodiments of the present disclosure. Therefore, the solution of device performance test provided by the embodiments of the present disclosure is an air interface test solution. In addition, when the device performance test is implemented based on air interface radiation, the antenna pattern of the device under test can be determined after the test environment is constructed, so it is unnecessary to test the antenna pattern of the device under test in advance, thereby improving the effect and capability of the device performance test.

In an embodiment of the present disclosure, the signal transmission module is configured to use respective element in a preset channel simulation matrix as an initial phase of respective sub-path of respective probe in the anechoic chamber, and simulate the channel used for transmitting the signal according to a pre-fading synthesis method.

Where, the number of rows of the channel simulation matrix is equal to the number of sub-paths in each sub-path cluster, the number of columns of the channel simulation matrix is equal to the number of probes, and the $m^{th}$ element in the $k^{th}$ column of the channel simulation matrix represents an initial phase of the $m^{th}$ sub-path in any sub-path cluster contained in a channel corresponding to the $k^{th}$ probe; elements of each column of the channel simulation matrix are equal to a product of elements of a corresponding column in a preset discrete Fourier matrix and a rotation factor $\exp(j\alpha_k)$ corresponding to the column, $\alpha$ in a rotation factor corresponding to respective column of the preset discrete Fourier matrix is distributed between $[0,2\pi]$ evenly.

In this way, when the channel is simulated, the discrete Fourier matrix is used to improve the initial phases of the sub-paths in respective sub-path cluster in the channel model, so the time correlation of the simulated channel can keep consistent with that of the channel. On the basis of not affecting the time correlation of the channel, the reproduction effect of the spatial correlation of the channel is improved.

In an embodiment of the present disclosure, the signal transmission module is configured to perform convolution multiplication on the signal by using a time response of the simulated channel, and perform the simulated transmission on the signal.

Because the convolution multiplication is performed on the signal by using the time response of the simulated channel, as a result, the simulated transmission can be performed on the signal.

In an embodiment of the present disclosure, respective probe in the anechoic chamber is connected to an output interface through a power amplifier.

The signal receiving module is configured to receive, through the output interface, the signal sent by the power amplifier connected to respective probe in the anechoic chamber.

Since the power amplifier can compensate for the path loss of the signal between the probe and the device under test, the signal loss can be reduced by the power amplifier.

Figure 9:
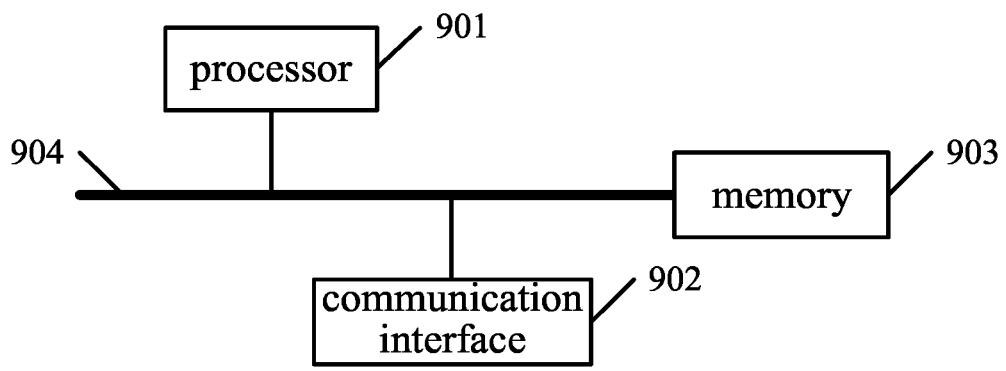
FIG. 9 is a structural diagram of a channel simulator according to an embodiment of the present disclosure.

An embodiment of the present disclosure provides an apparatus for device performance test. The apparatus may be a channel simulator, as shown in FIG. 9. The channel simulator includes a processor 901, a communication interface 902, a memory 903, and a communication bus 904. The processor 901, the communication interface 902 and the memory 903 communicate with each other through the communication bus 904.

The memory 903 is configured to store a computer program.

The processor 901 is configured to execute the program stored in the memory 903, to perform the method for device performance test provided in the embodiments of the present disclosure.

The communication bus in the channel simulator may be a Peripheral Component Interconnect (PCI) bus or an Extended Industry Standard Architecture (EISA) bus. The communication bus may be classified into an address bus, a data bus, a control bus and so on. For the convenience of representation, only one thick line is used in the figure, but it does not mean that there is only one bus or one type of bus.

The communication interface is configured to communicate between the above channel simulator and other devices.

The memory may include a Random Access Memory (RAM), and may also include a Non-Volatile Memory (NVM), for example, at least one disk memory. Alternatively, the memory may also be at least one storage device located away from the processor.

The above processor may be a general-purpose processor, including a Central Processing Unit (CPU), a Network Processor (NP), etc. It may also be a Digital Signal Processor (DSP), an Application Specific Integrated Circuit (ASIC), a Field-Programmable Gate Array (FPGA) or other programmable logic devices, discrete gates or transistor logic devices, discrete hardware components.

In another embodiment of the present disclosure, a computer-readable storage medium is provided. The computer-readable storage medium stores a computer program that, when executed by a processor, performs the steps of any of the above device performance test methods.

In another embodiment of the present disclosure, a computer program product is provided. The computer program product includes instructions that, when executed on a computer, cause the computer to perform any device performance test method in the foregoing embodiments.

All or part of the foregoing embodiments may be implemented by software, hardware, firmware, or any combination thereof. When implemented by software, all or part of the foregoing embodiments may be implemented in the form of a computer program product. The computer program product includes one or more computer instructions. When the computer program instructions are loaded and executed on a computer, all or part of the processes or functions described in the embodiments of the present disclosure are generated. The computer may be a general-purpose computer, a special-purpose computer, a computer network, or other programmable devices. The computer instructions may be stored in a computer-readable storage medium, or transmitted from one computer-readable storage medium to another computer-readable storage medium. For example, the computer instructions may be transmitted from a website, a computer, a server, or a data center to another website, computer, server or data center via a wired mode (such as a coaxial cable, an optical fiber and a digital subscriber line (DSL)) or a wireless mode (such as infrared, wireless, microwave, etc.). The computer-readable storage medium may be any available medium that can be accessed by the computer or a data storage device (such as a server or a data center) integrated with one or more available mediums. These available mediums may be a magnetic medium (for example, a floppy disk, a hard disk, a magnetic tape), an optical medium (for example, a DVD), or a semiconductor medium (for example, a solid state disk (SSD)).

It should be noted that, the terms "first" and "second" described in the embodiments are only used to distinguish one object or operation from another object or operation, but do not require or hint a specific relation or order among these objects or operations. The term "include", "contain" or any other variation thereof means "include but not limited to", so that processes, methods, articles or apparatuses including a serious of elements not only include those elements, but also include other elements which are not listed explicitly, or include fixed elements of these processes, methods, articles or apparatuses. If there are no more limits, elements limited by the sentence "include a . . . " may include other identical elements in the processes, methods, articles or apparatuses including the elements.

The various embodiments in this specification are described in a related manner, the same or similar parts in the various embodiments may be referred to each other, and each embodiment focuses on the differences from other embodiments. In particular, for the embodiments of the apparatus, the channel simulator, the computer-readable storage medium, and the computer program product containing instructions, since they are basically similar to the method embodiments, the description is relatively simple. Related details may refer to the part of the method embodiments.

The foregoing is only embodiments of the present disclosure and is not used to limit the protection scope of the present disclosure. Any modification, equivalent substitution and improvement without departing from the spirit and principle of the present disclosure are within the protection scope of the present disclosure.

What is claimed is:

1. A method for device performance test, applied to a channel simulator, and comprising:
    receiving a signal sent by a base station simulator;
    simulating a channel used for transmitting the signal, and performing simulated transmission on the signal based on the simulated channel, wherein a spatial correlation of the simulated channel satisfies an equation:

$$\rho_t(u_1, u_2) = \frac{1}{M} \sum_{m=1}^{M} G_{u_1}(\vartheta_m) G_{u_2}(\vartheta_m)^*$$

wherein, $u_1$, $u_2$ represents an identification of an antenna of a device under test, $\rho_t(u_1, u_2)$ represents the spatial correlation of the simulated channel, M is the number of sub-paths in each sub-path cluster in a preset channel, $\vartheta_m$ represents an angle of arrival (AoA) of the $m^{th}$ sub-path, $G_{u_1}(\vartheta_m)$ represents an antenna pattern of the $u_1^{th}$ antenna of the device under test that is placed in an anechoic chamber, and $G_{u_2}(\vartheta_m)^*$ represents a conjugate of an antenna pattern of the $u_2^{th}$ antenna of the device under test;
    sending the signal after the simulated transmission to respective probe in the anechoic chamber through an output interface connected to the probe, so that the probe radiates the received signal in the anechoic chamber in which the device under test is placed, and performs performance test on the device under test, wherein each probe is connected to an output interface of the channel simulator.

2. The method of claim 1, wherein the simulating a channel used for transmitting the signal comprises:
    using respective element in a preset channel simulation matrix as an initial phase of respective sub-path of respective probe in the anechoic chamber, and simulating the channel used for transmitting the signal according to a pre-fading synthesis method;
    wherein the number of rows of the channel simulation matrix is equal to the number of sub-paths in each sub-path cluster, the number of columns of the channel simulation matrix is equal to the number of probes, and the $m^{th}$ element in the $k^{th}$ column of the channel simulation matrix represents an initial phase of the $m^{th}$ sub-path in a sub-path cluster contained in a channel corresponding to the $k^{th}$ probe; elements of each column of the channel simulation matrix are equal to a product of elements of a corresponding column in a preset discrete Fourier matrix and a rotation factor $\exp(j\alpha_k)$ corresponding to the column, $\alpha$ in a rotation factor corresponding to respective column of the preset discrete Fourier matrix is distributed between $[0, 2\pi]$ evenly.

3. The method of claim 1, wherein the performing simulated transmission on the signal based on the simulated channel comprises:
    performing convolution multiplication on the signal by using a time response of the simulated channel, and performing the simulated transmission on the signal.

4. The method of claim 1, wherein respective probe in the anechoic chamber is connected to an output interface through a power amplifier;
    the sending the signal after the simulated transmission to respective probe in the anechoic chamber through an output interface connected to the probe comprises:
    sending, through the output interface, the signal after the simulated transmission to the power amplifier connected to the probe in the anechoic chamber, so that the power amplifier amplifies the received signal, and sends the amplified signal to the probe.

5. The method of claim 2, wherein respective probe in the anechoic chamber is connected to an output interface through a power amplifier;

the sending the signal after the simulated transmission to respective probe in the anechoic chamber through an output interface connected to the probe comprises:

sending, through the output interface, the signal after the simulated transmission to the power amplifier connected to the probe in the anechoic chamber, so that the power amplifier amplifies the received signal, and sends the amplified signal to the probe.

6. The method of claim 3, wherein respective probe in the anechoic chamber is connected to an output interface through a power amplifier;

the sending the signal after the simulated transmission to respective probe in the anechoic chamber through an output interface connected to the probe comprises:

sending, through the output interface, the signal after the simulated transmission to the power amplifier connected to the probe in the anechoic chamber, so that the power amplifier amplifies the received signal, and sends the amplified signal to the probe.

7. A method for device performance test, applied to a channel simulator, and comprising:

receiving a signal sent by respective probe in an anechoic chamber through an output interface connected to the probe, wherein each probe is connected to an output interface of the channel simulator;

simulating a channel used for transmitting the signal, and performing simulated transmission on the signal based on the simulated channel, wherein a spatial correlation of the simulated channel satisfies an equation:

$$\rho_t(u_1, u_2) = \frac{1}{M}\sum_{m=1}^{M} G_{u_1}(\vartheta_m)G_{u_2}(\vartheta_m)^*$$

wherein, $u_1$, $u_2$ represents an identification of an antenna of a device under test, $\rho_t(u_1, u_2)$ represents the spatial correlation of the simulated channel, M is the number of sub-paths in each sub-path cluster in a preset channel, $\vartheta_m$ represents an angle of arrival (AoA) of the $m^{th}$ sub-path, $G_{u_1}(\vartheta_m)$ represents an antenna pattern of the $u_1^{th}$ antenna of the device under test that is placed in an anechoic chamber, and $G_{u_2}(\vartheta_m)^*$ represents a conjugate of an antenna pattern of the $u_2^{th}$ antenna of the device under test;

sending the signal after the simulated transmission to a base station simulator, so that the base station simulator receives the signal and performs performance test on the device under test.

8. The method of claim 7, wherein the simulating a channel used for transmitting the signal comprises:

using respective element in a preset channel simulation matrix as an initial phase of respective sub-path of respective probe in the anechoic chamber, and simulating the channel used for transmitting the signal according to a pre-fading synthesis method;

wherein the number of rows of the channel simulation matrix is equal to the number of sub-paths in each sub-path cluster, the number of columns of the channel simulation matrix is equal to the number of probes, and the $m^{th}$ element in the $k^{th}$ column of the channel simulation matrix represents an initial phase of the $m^{th}$ sub-path in any sub-path cluster contained in a channel corresponding to the $k^{th}$ probe; elements of each column of the channel simulation matrix are equal to a product of elements of a corresponding column in a preset discrete Fourier matrix and a rotation factor $\exp(j\alpha_k)$ corresponding to the column, $\alpha$ in a rotation factor corresponding to respective column of the preset discrete Fourier matrix is distributed between $[0,2\pi]$ evenly.

9. The method of claim 7, wherein the performing simulated transmission on the signal based on the simulated channel comprises:

performing convolution multiplication on the signal by using a time response of the simulated channel, and performing the simulated transmission on the signal.

10. The method of claim 7, wherein respective probe in the anechoic chamber is connected to an output interface through a power amplifier;

the receiving a signal sent by respective probe in an anechoic chamber through an output interface connected to the probe comprises:

receiving, through the output interface, the signal sent by the power amplifier connected to respective probe in the anechoic chamber.

11. The method of claim 8, wherein respective probe in the anechoic chamber is connected to an output interface through a power amplifier;

the receiving a signal sent by respective probe in an anechoic chamber through an output interface connected to the probe comprises:

receiving, through the output interface, the signal sent by the power amplifier connected to respective probe in the anechoic chamber.

12. The method of claim 9, wherein respective probe in the anechoic chamber is connected to an output interface through a power amplifier;

the receiving a signal sent by respective probe in an anechoic chamber through an output interface connected to the probe comprises:

receiving, through the output interface, the signal sent by the power amplifier connected to respective probe in the anechoic chamber.

13. An apparatus for device performance test, comprising:
a memory, configured to store a computer program; and
a processor, configured to execute the program stored in the memory, to perform a process of:
receiving a signal sent by a base station simulator;
simulating a channel used for transmitting the signal, and performing simulated transmission on the signal based on the simulated channel, wherein a spatial correlation of the simulated channel satisfies an equation:

$$\rho_t(u_1, u_2) = \frac{1}{M}\sum_{m=1}^{M} G_{u_1}(\vartheta_m)G_{u_2}(\vartheta_m)^*$$

wherein, $u_1$, $u_2$ represents an identification of an antenna of a device under test, $\rho_t(u_1, u_2)$ represents the spatial correlation of the simulated channel, M is the number of sub-paths in each sub-path cluster in a preset channel, $\vartheta_m$ represents an angle of arrival (AoA) of the $m^{th}$ sub-path, $G_{u_1}(\vartheta_m)$ represents an antenna pattern of the $u_1^{th}$ antenna of the device under test that is placed in an anechoic chamber, and $G_{u_2}(\vartheta_m)^*$ represents a conjugate of an antenna pattern of the $u_2^{th}$ antenna of the device under test;

sending the signal after the simulated transmission to respective probe in the anechoic chamber through an output interface connected to the probe, so that the probe radiates the received signal in the anechoic chamber in which the device under test is placed, and performs performance test on the device under test, wherein each probe is connected to an output interface of the channel simulator.

14. The apparatus of claim 13, wherein the simulating a channel used for transmitting the signal comprises:
using respective element in a preset channel simulation matrix as an initial phase of respective sub-path of respective probe in the anechoic chamber, and simulating the channel used for transmitting the signal according to a pre-fading synthesis method;
wherein the number of rows of the channel simulation matrix is equal to the number of sub-paths in each sub-path cluster, the number of columns of the channel simulation matrix is equal to the number of probes, and the $m^{th}$ element in the $k^{th}$ column of the channel simulation matrix represents an initial phase of the $m^{th}$ sub-path in a sub-path cluster contained in a channel corresponding to the $k^{th}$ probe; elements of each column of the channel simulation matrix are equal to a product of elements of a corresponding column in a preset discrete Fourier matrix and a rotation factor $\exp(j\alpha_k)$ corresponding to the column, $\alpha$ in a rotation factor corresponding to respective column of the preset discrete Fourier matrix is distributed between [0,2π] evenly.

15. The apparatus of claim 13, wherein the performing simulated transmission on the signal based on the simulated channel comprises:
performing convolution multiplication on the signal by using a time response of the simulated channel, and performing the simulated transmission on the signal.

16. The apparatus of claim 13, wherein respective probe in the anechoic chamber is connected to an output interface through a power amplifier;
the sending the signal after the simulated transmission to respective probe in the anechoic chamber through an output interface connected to the probe comprises:
sending, through the output interface, the signal after the simulated transmission to the power amplifier connected to the probe in the anechoic chamber, so that the power amplifier amplifies the received signal, and sends the amplified signal to the probe.

* * * * *